United States Patent

Tarbell et al.

[15] 3,644,240
[45] Feb. 22, 1972

[54] ROOF INSULATION ADHESIVE

[72] Inventors: Harlan E. Tarbell, Torrance; Donald W. Mogg, Redondo Beach, both of Calif.; Frederick L. Shea, Johnson City, Tenn.

[73] Assignee: Grefco, Inc., Philadelphia, Pa.

[22] Filed: Oct. 14, 1968

[21] Appl. No.: 767,478

Related U.S. Application Data

[63] Continuation-in-part of Ser. No. 493,218, Oct. 5, 1965, abandoned.

[52] U.S. Cl. ..............................260/4 R, 260/2.3, 260/5, 260/28.5 AS, 260/29.7 UA, 260/33.6 UA, 260/33.8 UA, 260/41 R, 260/41.5 R, 260/888, 260/889, 260/890, 260/894, 260/897 A
[51] Int. Cl. ......................................C08d 9/12, C08f 45/52
[58] Field of Search............260/28.5 AS, 4, 29.7 D, 29.7 UA

[56] References Cited

UNITED STATES PATENTS

| | | | |
|---|---|---|---|
| 2,918,940 | 12/1959 | Carr | 260/28.5 |
| 3,097,179 | 7/1963 | Ceintrey | 260/28.5 |
| 3,277,038 | 10/1966 | Wood | 260/28.5 |
| 3,337,987 | 8/1967 | Bennett | 260/28.5 |
| 3,338,849 | 8/1967 | Johnson | 260/4 |
| 3,379,662 | 4/1968 | Bramble et al. | 260/28.5 |
| 3,404,108 | 10/1968 | Regenstein et al. | 260/4 |
| 3,042,635 | 7/1962 | Wood | 260/28.5 |

*Primary Examiner*—John C. Bleutge
*Attorney*—Everett H. Murray, Jr. and Francis D. Neruda

[57] ABSTRACT

Excellent adhesives are prepared with: asphalt, about 40 parts by weight; an unsaturated rubber such as devulcanized tire rubber, 1 to 18 percent; a saturated rubber such as butyl rubber, 0.7 to 3 percent; a water-immiscible asphalt solvent, 20 to 41 parts; and water 5 to 20 parts. The devulcanized rubber, when used, may have been rendered more compatible with asphalt by having been previously compounded with about half its weight of polyethylene.

8 Claims, No Drawings

ROOF INSULATION ADHESIVE

The application is a continuation-in-part of Ser. No. 493,218, filed Oct. 5, 1965, now abandoned.

Although the use of bitumens such as asphalt and pitches in adhesive formulations for roofing purposes is well known in the art, it is attended by serious problems and inconveniences.

First, there is the matter of application. When asphalt is used as the adhesive for securing insulation board and vapor barrier to the deck of a roof, it is conventionally applied by a hot mop process. The solid asphalt is first melted and spread over the surface of the deck with a mop. The vapor barrier, when used, is laid on the deck and covered with molten asphalt. The board is then laid on the deck. Such an application process entails the use of heavy melting equipment and requires relatively long periods of time for melting the asphalt. In contrast, a cold application adhesive can be applied immediately and thus make possible high-production rates with the use of a minimum of equipment. Furthermore, another defect of the hot mop process is that it results in the net deposition of quantities of asphalt far in excess of what is needed for adhesion of the board to the roof. Any application process which would eliminate this excess of combustible hot mopped bitumen between the metal roof deck and roof insulation, would ultimately be of some benefit against the propagation of fire within a building and achieve significant reduction of the quantity of dense black smoke that is generated by the burning of heavy concentrations of bitumen.

While the art of cold application adhesives is not new, its penetration in the field of roof deck insulation has so far been primarily limited to adhesives based on rubber dissolved in organic solvents, the so-called rubber cements. These rubber cements are rather difficult to produce in that they require the use of heavy mixers and long mixing periods; they are fairly expensive and in some cases they appear to gel on aging.

An object of this invention therefore is to provide bitumen-base adhesives that can be applied at ordinary ambient temperatures. Another object is to provide cold application adhesives that can be spread easily and economically and thus avoid the undesirable excess bitumen deposits that are usually laid down by the hot mop process. A further object is to provide an easily prepared cold application adhesive for roof decks that is stable on aging before and after application.

These and other objects which will become apparent in the course of the description of this invention, have been accomplished by compounding bitumens with both saturated and unsaturated rubbers in certain critical proportions. The resulting compositions are diluted for workability with one or more organic solvents and contain a prescribed amount of water as well as an emulsifying agent and a water-swelling clay.

The following examples will illustrate the new formulations and their excellent properties. They must not be construed however as limitations of the invention beyond the scope of the appended claims.

EXAMPLE I

| | Parts by weight |
|---|---|
| Asphalt, softening point 145° F. | 45 |
| Unsaturated Rubber | 5 |
| VM&P naphtha, b.p. 248–284° F. | 17 |
| Trichloroethylene | 12 |
| Butyl rubber solution | 5 |
| Wyoming bentonite | 1.5 |
| Water | 14.5 |

The unsaturated rubber used in this formulation was an asphalt-soluble finely divided reclaimed rubber prepared according to Example II of U.S. Pat. No. 3,338,849. It had a specific gravity of about 1.15, a bulk density of approximately 15 pounds per cubic foot and its particle size was such that 80 percent of it passed through a 20 mesh screen and 100 percent through a 10-mesh screen. The material consisted substantially of 40 parts by weight devulcanized rubber prepared from fiber-free whole tire scrap by the process of U.S. Pat. No. 3,051,990, 26 parts ground scrap polyethylene, 16 parts gilsonite, 11 parts anthracite coal dust and 7 parts whiting. The butyl rubber solution was a mineral spirit solution containing 30 percent by weight of a butyl rubber made from a monomer mixture consisting of 98 percent isobutene and 2 percent butadiene. Loxite 8011, a product of the Firestone Tire and Rubber Company, is an excellent example of this type of material. The bentonite used is marketed by the American Colloid Company under the designation of Volclay 200.

The unsaturated rubber was dissolved in the asphalt by stirring for one hour at 400° F. The butyl rubber solution, the naphtha and the trichloroethylene were added to the asphalt while stirring. A suspension of the Wyoming bentonite in the water was then emulsified into the asphalt-rubber-solvent mixture.

On testing, the resulting adhesive composition was found to possess excellent useful properties. The product is self-extinguishing in that it will not support combustion in a can at 75° F. after ignition of its vapors with a match. It does not run when applied to a piece of sheet metal and burned to a char with a gas burner. It flows at 0° C. when poured from the can. It has good initial tensile tack when spread on a piece of metal and covered with insulation board. It does not completely soak into an insulation board and yet wets it sufficiently for good adhesion. It develops a tensile strength bond of over 100 p.s.i. when securing two pieces of steel together. Its tendency to form a skin on its surface by solvent evaporation is relatively minor in that the composition after being poured and left standing for two hours at 75° F. retains sufficient adhesive power to secure insulation board to roof deck. Finally, the adhesive composition is stable in storage, showing no noticeable deterioration after 18 months.

EXAMPLE 2

| | Parts by weight |
|---|---|
| Coal tar pitch, softening point 65° C. | 30 |
| Reclaimed tire rubber | 6 |
| Neoprene | 6 |
| Polyisobutylene | 4 |
| Carbon tetrachloride | 8 |
| Methylene chloride | 27 |
| Water | 17 |
| Wyoming bentonite | 2 |

The polyisobutylene was used was Enjay Chemical Company's Vistanex LM–MH. grade, a viscous, tacky semisolid containing less than 3 weight-percent volatile matter and having a specific gravity of 0.92 and a Staudinger Viscosity average molecular weight of 8,700 to 11,700. The reclaimed tire rubber used was a conventional preparation containing natural rubber and SBR rubber, obtained from truck and automobile tires by devulcanization according to the process of U.S. Pat. No. 3,051,990, as described in Example I of U.S. Pat. No. 3,338,849.

To prepare the adhesive, the hot coal tar pitch was blended with the unsaturated rubbers by means of a high shear mixer. The polyisobutylene and the solvents were added with stirring at reflux temperature and an aqueous suspension of the bentonite was emulsified into the resulting solution.

The adhesive was found to be incombustible when stored in a can. It produced satisfactory bond between insulation board and metal.

Useful adhesive compositions within the scope of this invention comprise, on a weight basis: a bituminous substance having a softening point within the range of 110 to 250° F., 20 to 60 parts; a highly unsaturated rubber, 1 to 30 parts; a saturated rubber, 0.5 to 12 parts; organic solvent, 10 to 50 parts; and water, 5 to 45 parts. Other ingredients such as hydrophilic clays or emulsifying agents are present in small quantities.

These components may be added as undiluted liquids or solids, as the case may be, or, if desired or appropriate, the formulation may be built up from ingredients that are already partly compounded, dissolved or emulsified. In any event, the procedure to be followed is not too critical provided that it substantially parallels those of the examples and yields a fairly homogenous composition, and provided further that the exigencies of the formulation are respected in terms of proportions and materials.

Among the bitumens that can be used in the present compositions are such materials as asphalt, gilsonite, petroleum pitch, coal tar pitch, wood tar pitch, lignite tar pitch and so on, and mixtures thereof.

As to the rubber components, it has been seen and demonstrated that there must be present at least one nontacky highly unsaturated rubber and one tacky rubber. A highly unsaturated rubber, for the purpose of this invention, is one made principally from diene monomers such as butadiene and isoprene, and which contains, on a molar basis, at least 50 percent diene units. The function of this nontacky unsaturated rubber additive is to prevent excess absorption of the liquid adhesive preparation into insulation board or other porous materials and to increase the cohesive strength of the applied adhesive and its resistance to running on exposure to open flame. Materials that can satisfactorily fulfill these functions in the presence of the other components of our adhesive compositions include natural rubber, reclaimed devulcanized rubbers of various origins, synthetics such as styrene-butadiene copolymers, neoprene and so on. Reclaimed rubbers are preferred which have been devulcanized according to the process of U.S. Pat. No. 3,051,990. Said materials are especially preferred when they are "solubilized" by compounding according to U.S. Pat. No. 3,338,849 into formulations comprising 20 to 60 parts of the reclaimed rubber, 5 to 30 parts of gilsonite and 12 to 50 parts of polyethylene.

The tacky rubber to be used in our compositions is generally one that contains less than 20 percent unsaturated units on a molar basis, although there are certain more highly unsaturated polymers of low molecular weight that are sufficiently tacky to be employed to some advantage here. In any case, it is a rubber capable of providing an initial tensile strength of at least 0.5 p.s.i. to the bond provided by an asphalt adhesive preparation of the type disclosed herein, this when two steel plates bonded to each other with the adhesive are pulled apart in a direction perpendicular to their adhered surfaces. This component provides the initial tack to the freshly applied adhesive and yet does not interfere with the further functions of the composition. There can be used for this purpose a variety of materials including butadiene-acrylonitrile copolymers and the so-called butyl rubbers, i.e., copolymers of isobutylene with isoprene or butadiene. These rubber materials, especially the unsaturated types, may contain various conventional additives such as fillers, oils, accelerators and other rubber chemicals as well as polymers, other than polyethylene.

The solid components just enumerated are blended or dissolved in one or more organic solvents, preferably a hydrocarbon or a chlorinated hydrocarbon. A list of useful solvents includes benzene, petroleum naphtha, trichloroethylene, tetrachloroethane, pentachloroethane, carbon tetrachloride, chloroform, toluene, xylene, kerosene and so on. Where more than one type of solvent is used, it has been found advantageous to mix hydrocarbon and chlorinated hydrocarbon solvents in proportions such that the specific gravity of the organic phase of the adhesive preparation, bitumen and rubbers included, approximates 1. The flammability of the vapor generated by the liquid adhesive is also a factor that may be desirably considered.

As noted and illustrated earlier, water is used in formulating the present compositions. It may be slightly acidified and may contain wetting agent to facilitate its dispersion throughout the bitumen-rubber-solvent system. Small amounts of hydrophilic colloids such as sodium montmorillonite or Wyoming bentonite are suspended in the water before admixture with the organic phase. In this respect, 1 to 2 percent by weight of such water-swelling clay will maximize the contribution of the aqueous phase materials without unduly interfering with the other properties of the adhesive compositions. This contribution is evident both in the liquid adhesive preparation and after application. First, there is a decrease in skinning of the preparation on application as well as a decrease of vapor flammability during application and drying. Also, the clay helps prevent running of the dry adhesive subjected to abnormal heat conditions.

An excellent all-purpose adhesive composition may be prepared, within the limits already described, by using, on a weight basis, 20 to 60 parts of an asphalt melting between 130° and 190° F., 1 to 18 parts of a nontacky unsaturated rubber containing, on a molar basis, more than 50 percent of diene units, 0.7 to 3.0 parts of a tacky rubber containing less than 10 percent unsaturation, 20 to 41 parts of an organic liquid selected from the class consisting of hydrocarbons, chlorinated hydrocarbons and mixtures thereof, and 5 to 20 parts water. For roofing purposes, on the other hand, the most satisfactory results have been obtained with compositions comprising, on a weight bases: from 43 to 47 parts of an asphalt having a softening point within the range of 140° to 170° F.; 1 to 6 parts of a nontacky devulcanized rubber which preferably constitutes from 20 to 60 parts of an asphalt soluble preparation comprising 5 to 30 parts gilsonite and 12 to 50 parts polyethylene; 1 to 2 parts tacky saturated rubber; 25 to 37 parts of a mixture of hydrocarbon liquids, the proportions of said components being such that the density of the asphalt-rubber-organic liquid phase approximates 1 gram per milliliter; and 10 to 16 parts water.

It will be evident to those skilled in the art that additives other than those considered part of this invention can be included in the present formulations to accomplish special functions or to enhance the contribution of the required components. Suffice it to say in this respect that there can be added such materials as fire retardants, fillers, rubber curing agents and so on.

What we have discovered in short is a readily prepared economical adhesive composition which will not gel, separate or burn readily while in storage, is easy to apply in that it spreads without difficulty and has a very low tendency to skin over in open can or applicator, has excellent initial tack to hold roofing materials in place during evaporation of the solvents and yet permits the sliding of such materials into place, and finally possesses excellent aging properties in that bonds obtained from it increase in strength on aging.

What is claimed is:

1. An adhesive composition comprising a water-in-oil dispersion having on a weight basis:
   20 to 60 parts of a bitumen having a softening point within the range of 110° to 250° F.;
   1 to 30 parts of a nontacky unsaturated rubber containing at least 50 diene units on a molar basis;
   0.5 to 12 parts of a tacky saturated rubber containing less than 20% unsaturated units on a molar basis;
   10 to 50 parts of a water-immiscible organic volatile solvent for the bitumen; and
   5 to 45 parts water.

2. The composition of claim 1 wherein the bitumen is selected from the group consisting of asphalt, gilsonite, petroleum pitch, coal tar pitch, wood tar pitch, lignite tar pitch and mixtures thereof.

3. The composition of claim 1 wherein the unsaturated rubber is devulcanized tire rubber.

4. A stable homogeneous adhesive composition comprising, a water-in-oil dispersion having on a weight basis: 20 to 60 parts of an asphalt softening within the range of 130° to 190° F.; 1 to 18 parts of a nontacky unsaturated rubber selected from the group consisting of natural rubber, reclaimed rubber, copolymers of styrene and butadiene, neoprene and mixtures thereof which contain, on a molar basis, more than 50 percent diene units; about 0.7 to 3.0 parts of a tacky saturated rubber selected from the group consisting of polyisobutylene, butyl rubbers, and mixtures thereof, containing, on a molar basis, less than 20 percent unsaturated units; 20 to 41 parts of an organic liquid solvent selected from the class consisting of hydrocarbons, chlorinated hydrocarbons and mixtures thereof; and 5 to 20 parts water.

5. The composition of claim 4 wherein the organic liquid solvent is selected from the group consisting of benzene, petroleum naphtha, toluene, xylene, kerosene, trichloroethylene, tetrachloroethane, pentachloroethane, perchloroethylene, methyl chloride, carbon tetrachloride, chloroform and mixtures thereof.

6. The composition of claim 4 wherein 1 to 2 percent of a water-swelling clay has been incorporated into the aqueous phase.

7. A roofing adhesive composition, comprising a water-in-oil dispersion having on a weight basis: about 43 to 47 parts of an asphalt having a softening point within the range of 140° to 170° F., about 1 to 6 parts nontacky unsaturated devulcanized tire rubber; about 1 to 2 parts tacky saturated rubber selected from the group consisting of polyisobutylene, butyl rubbers and mixtures thereof; about 25 to 37 parts of a solvent mixture of saturated hydrocarbon liquids and chlorinated hydrocarbon liquids in proportions such that the specific gravity of the asphalt-rubber-solvent mixture approximates 1; and 10 to 16 percent water.

8. The composition of claim 7 wherein the devulcanized tire rubber constitutes 20 to 60 parts of a mixture also comprising 5 to 30 parts gilsonite and 12 to 50 parts polyethylene.

* * * * *